(12) United States Patent
Johnston

(10) Patent No.: US 8,245,468 B2
(45) Date of Patent: Aug. 21, 2012

(54) HOLLOW WALL BASE

(75) Inventor: Curtis F. Johnston, Auburn, OH (US)

(73) Assignee: Johnsonite Inc., Chagrin Falls, OH (US)

( * ) Notice: Subject to any disclaimer, the term of this patent is extended or adjusted under 35 U.S.C. 154(b) by 470 days.

(21) Appl. No.: 12/148,082

(22) Filed: Apr. 15, 2008

(65) Prior Publication Data

US 2008/0236072 A1 Oct. 2, 2008

Related U.S. Application Data

(63) Continuation-in-part of application No. 11/174,832, filed on Jul. 5, 2005, now abandoned.

(51) Int. Cl.
*E04B 5/00* (2006.01)
(52) U.S. Cl. ............................ 52/290; 52/287.1; 439/120
(58) Field of Classification Search .................. 52/287.1, 52/290, 220.7; 439/120; D25/119, 136
See application file for complete search history.

(56) References Cited

U.S. PATENT DOCUMENTS

| | | | |
|---|---|---|---|
| 3,676,974 A | 7/1972 | Daly | |
| 3,899,859 A | 8/1975 | Smith | |
| 3,975,467 A | 8/1976 | Beck | |
| 4,037,900 A | 7/1977 | Schmidger | |
| 4,642,957 A | 2/1987 | Edwards | |
| 4,663,906 A | 5/1987 | Weinar | |
| 5,357,053 A | 10/1994 | Manaras | |
| 5,562,796 A * | 10/1996 | Ertel | 156/498 |
| 5,598,681 A | 2/1997 | DiGianni | |
| 5,752,356 A | 5/1998 | Miklavic | |
| 5,901,514 A | 5/1999 | Wolfe | |
| 5,979,132 A | 11/1999 | Margarit | |
| 6,191,363 B1 | 2/2001 | Samuels | |
| 6,202,380 B1 | 3/2001 | Trutwin | |
| 6,216,406 B1 | 4/2001 | Hauser | |

(Continued)

FOREIGN PATENT DOCUMENTS

FR 2 191 577 2/1974

(Continued)

*Primary Examiner* — Jeanette E Chapman
*Assistant Examiner* — Daniel Kenny
(74) *Attorney, Agent, or Firm* — D. Peter Hochberg; Sean F. Mellino; Daniel J. Smola

(57) ABSTRACT

A flexible, extruded plastic wall structure with a hollow core is presented along with a method of making the same. The wall structure has an overall flat back wall, an overall front wall and at least one support wall extending between and confined to the interior surfaces of the overall back wall and the overall front wall; the overall back wall, the overall front wall and the at least one support wall having a generally uniform thickness and defining at least two defined spaces. The wall structure includes sections, where the rear wall of each section is flat from the bottom of the wall structure to the top of the wall structure. The hollow wall structure has a front wall having vertically disposed sections with different contours. The method includes using extrusion die for heating and extruding plastics using a multi-functional insert within the die and air pressure to create a hollow core in the wall structure. The hollow core allows less material to flow though the die so that the die stays hotter and the flow of the extruded plastic is not impeded. The resulting extruded plastic wall structure is comprised of a generally thick portion, a generally thin portion and a profile on the face or front of the wall structure.

10 Claims, 7 Drawing Sheets

U.S. PATENT DOCUMENTS

| | | |
|---|---|---|
| 6,290,885 B1 * | 9/2001 | Roetheli et al. ............... 264/108 |
| 6,457,287 B1 | 10/2002 | Wilcox |
| D483,883 S | 12/2003 | Glatz |
| D483,884 S | 12/2003 | Glatz |
| 6,918,221 B2 * | 7/2005 | Williams ..................... 52/592.1 |
| 7,703,250 B2 * | 4/2010 | Girnghuber ................. 52/302.3 |
| 2005/0055936 A1 | 3/2005 | Murphy, Jr. |

FOREIGN PATENT DOCUMENTS

| | | |
|---|---|---|
| GB | 2 346 396 | 8/2000 |
| JP | 2003 239523 | 8/2003 |
| WO | WO 02/066764 A2 | 8/2002 |

* cited by examiner

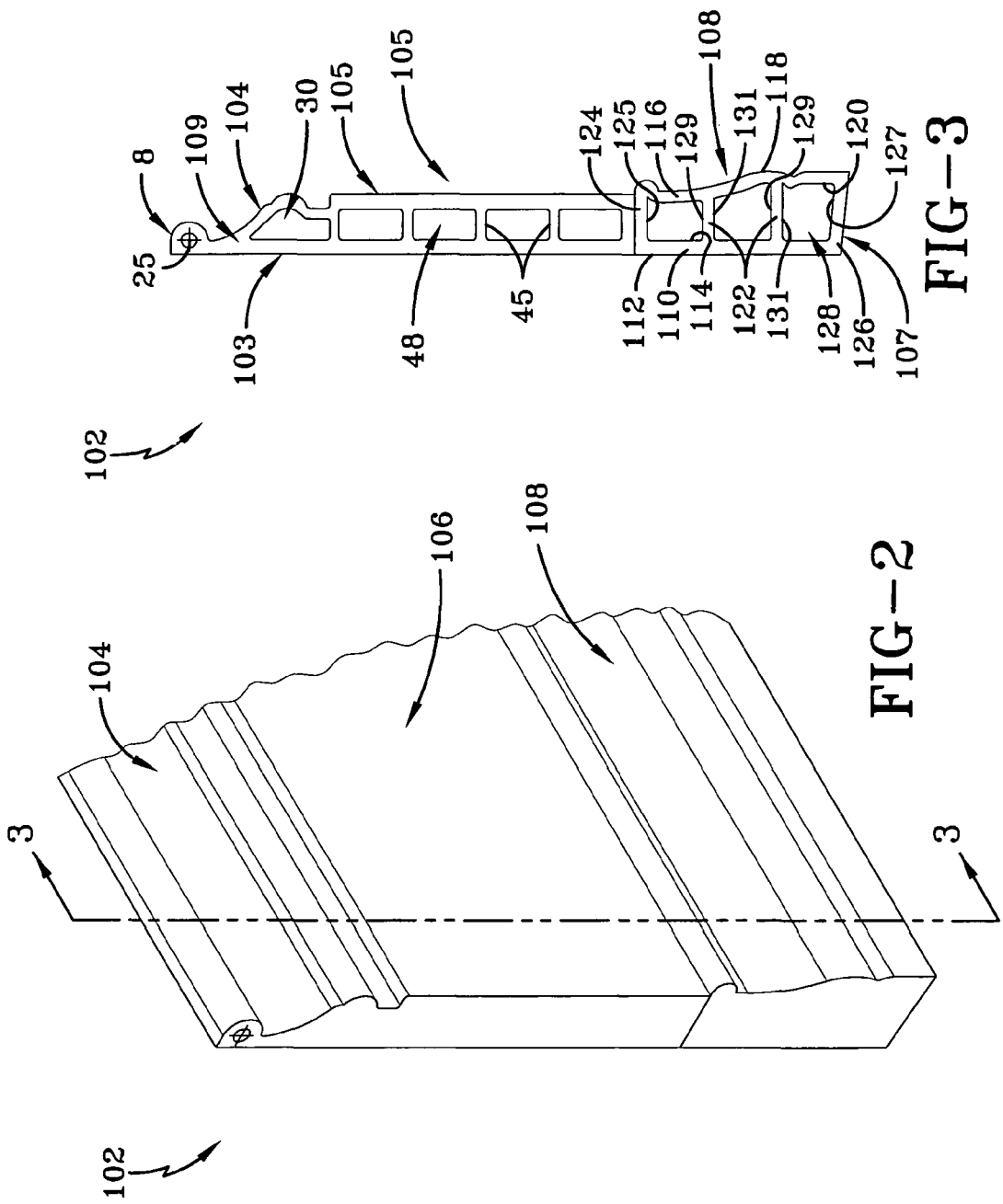

HOLLOW WALL BASE

CROSS-REFERENCE TO RELATED APPLICATION

This application is a continuation-in-part of U.S. patent application Ser. No. 11/174,832 filed Jul. 5, 2005.

BACKGROUND OF THE INVENTION

1. Field of the Invention

The present invention relates generally to wall structures, and in particular, baseboards or wall bases. The invention relates more specifically to an extruded plastic wall structure with a hollow core, and methods for making such a wall structure.

2. Description of Prior Art

Baseboards and wall bases are known in the art as molding or trim applied at the base of a wall to complete the intersection of the wall and the floor. These wall bases decorate as well as protect the wall from scuffing and impact from feet, vacuum cleaners, wheelchairs, dollies, wheeled furniture, etc. Furthermore, the wall bases protect the edge of the carpet or flooring adjacent to the wall. In addition, the wall base can hide unsightly electrical, telephone or other wires, protecting the wires from damage and preventing people from tripping over these wires or inadvertently touching them.

A variety of wall bases exist, including those made of wood, metal and plastic. Wood wall bases are generally more expensive than plastic, and wood is considered to be more elegant, elaborate and traditional. However, the look of wood can be successfully emulated or evoked with well-constructed plastic wall bases. Complex wall structure profiles can be extruded from plastic more easily than machined from wood. However, one disadvantage of using plastic is that solid plastic wall structures can be heavy, especially in contrast to wood wall bases. Extrusion molding of solid wall bases has additional problems. These solid wall bases are often quite thick and inflexible. Further, there may be warping or distortion due to uneven cooling of wall bases with uneven thicknesses and the solid, heavy, inflexible bases can be difficult to install. Moreover, warped or distorted wall bases may be unsightly.

Furthermore in regard to the extrusion process, flooring manufacturers have failed to produce a satisfactory wall base with a specific thickness. During Applicant's process of developing and testing samples of a wall base profile requested by a customer, the customer sought a company in the business of designing and manufacturing plastic wall bases and producing a hollow plastic wall base, and requested a cost estimate to produce such a wall base. The competitor could not provide such a cost estimate and stated it was beyond their capability to produce a hollow wall base. The failure of Applicant's competitor indicates the unobviousness of the present invention.

In contrast to solid wall bases, those comprising one or two parts, with covers, are often used in conditions in which it is desired to install and hide telephone, electrical or other wires. In these situations, the wires are placed under the cover of the wall base. For example, U.S. Pat. No. 5,598,681 discloses a baseboard made from a resin material. This baseboard has two parts, a backwall which abuts with a room wall and a front cover. A hollow exists between the backwall and the front cover, and wires, such as telephone or electric wires, can be installed in this hollow space. A problem with the prior art is that the baseboard is comprised of more than one part, making manufacturing, shipping and installation difficult and expensive.

U.S. Pat. No. 6,457,287 to Wilcox discloses a horizontally disposed when in use window sill cover having a hollow body with a lower wall and an upper wall. Interior support walls are disposed between the upper wall and the lower wall. This arrangement of the lower wall, the upper wall and interior support walls define air spaces within the body. A convex terminal portion is a semicircle in cross section with a hollow air space, which is connected to the body. The convex terminal portion has a vertically disposed portion for extending vertically over the edge of the window sill. The window sill cover of the '287 patent could never function as a wall base since it cannot lie flat against a wall. Furthermore, the window sill cover of the '287 patent has very thin walls, and would not be expected to withstand the impacts which would likely occur with wall bases. It is not known if the product disclosed in U.S. Pat. No. 6,457,287 was ever made.

On the contrary, in the various embodiments of the present wall structure, the rear wall of each section is flat from the bottom of the wall structure to the top of the wall structure. This flat rear wall section abuts the wall of the room where the wall structure is installed. Additionally, the contour of the rear wall of at least one section of the wall structure is different from the contour the front wall of at least one section of the wall structure, which is not the case with Wilcox. Furthermore, the wall thickness of the inventive products described below is able to withstand impacts expected to occur in wall structures.

There is a need for a wall structure which is lightweight, thinner than wood or solid plastic wall structure, contains a minimal number of parts, and is easy and cost effective to manufacture, to ship and to install. The present invention fills the need for such a wall structure in a unique manner.

SUMMARY OF THE INVENTION

An object of this invention is to provide a wall structure which can be manufactured relatively quickly and easily.

A further object of this invention is to provide a plastic wall structure which is lightweight and easy to handle.

Another object of this invention is to provide a plastic wall structure which creates less scrap during its manufacture than prior art.

Yet another object of this invention is to provide a plastic wall structure which is inexpensive to manufacture.

An additional object is to provide a plastic wall structure which cools during manufacture in a uniform manner to avoid warping and distortion of the wall structure.

It is an additional object to provide an integral wall structure which can conceal wires.

A further object is to provide a wall structure of complex configuration which can be molded in a fast manner without warping or incurring distortions to its shape.

Yet another object is the provision of a molded plastic wall structure having a flat and curved front surface.

An additional object is to provide an extruded molded plastic wall structure with thin and thick portions.

Another object is to provide a wall structure with sections, where the rear wall of each section is flat from the bottom of the wall structure to the top of the wall structure.

It is still a further object of the invention to provide a hollow wall structure of sufficient strength to withstand impacts as one would expect to occur to wall structures.

An additional object is to provide a hollow wall structure with a front wall having vertically disposed sections with different contours.

A further object is to provide a hollow wall structure where the contour of the rear wall of at least one section of the wall structure is different from the contour the front wall of at least one section of the wall structure.

Yet another object is to provide a wall structure with a "millwork appearance."

These and other objects will become apparent from the following description of a preferred embodiment taken together with the accompanying drawings and the appended claims.

The foregoing objects are achieved according to the preferred embodiments of the invention by the provision of a wall structure having an overall flat back wall, an overall front wall and at least one support wall extending between and confined to the interior surfaces of the overall back wall and the overall front wall; the overall back wall, the overall front wall and the at least one support wall having a generally uniform thickness and defining at least two defined spaces.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 2 is a perspective view of another embodiment of the wall structure;

FIG. 3 is shows a side, cross-sectional view of wall structure of FIG. 2, taken in the direction 3-3, with spaces or voids being visible;

DETAILED DESCRIPTION OF THE PREFERRED EMBODIMENT

Figure 1:
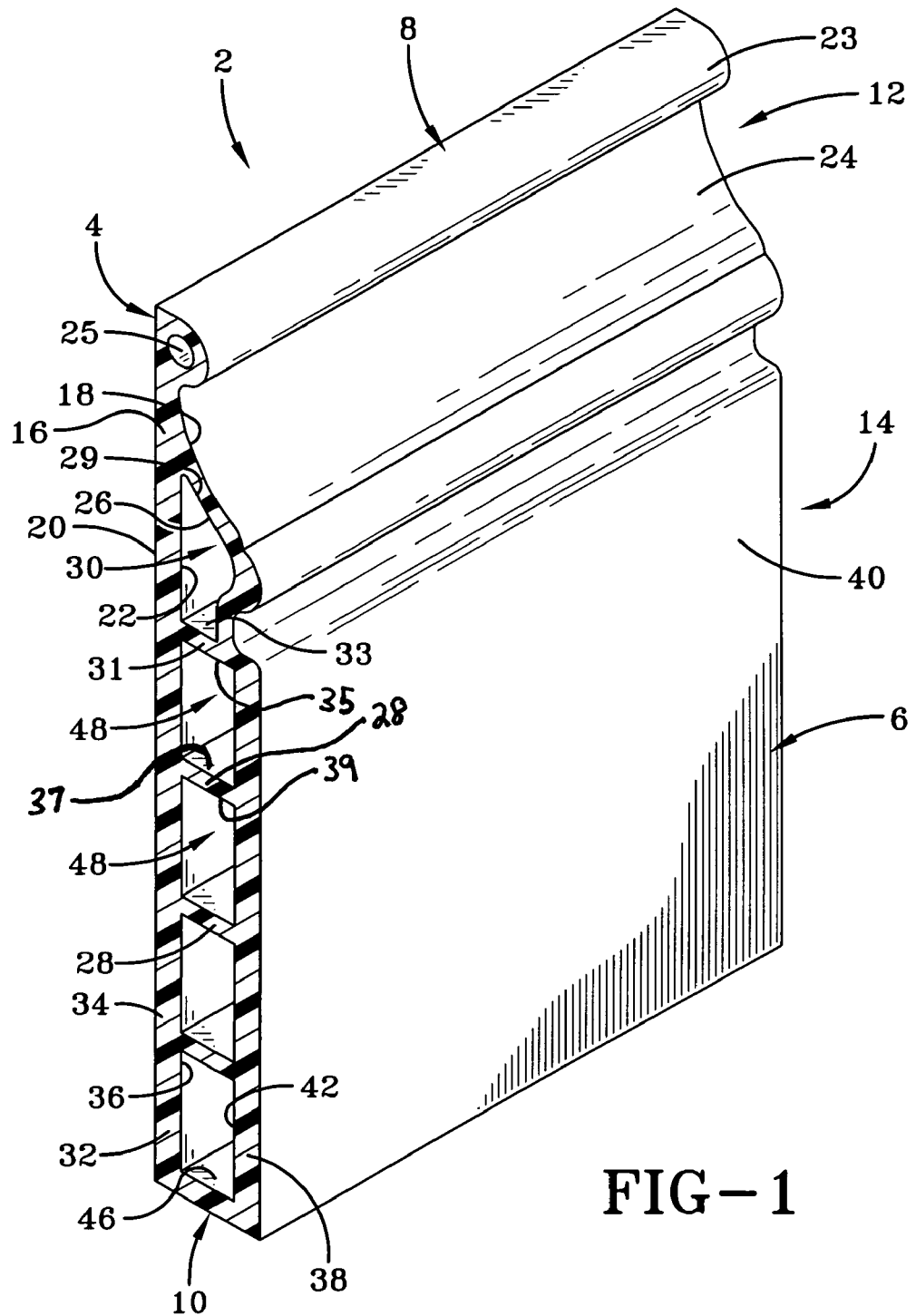
FIG. 1 is a perspective view of one embodiment of the wall structure.

The wall structure of the present invention can comprise any number of various shapes and sizes. The wall structure has an overall back wall and an overall front wall.

An important object of the present invention is to provide a wall structure with a "millwork appearance." A "millwork appearance" means a configuration in all or part of the overall front wall of a hollow wall structure having the appearance of a wood wall structure having been machined by a mill, and having one or more continuous and constant regular or irregular curves extending along the length of the structure, the cross-section of the overall front wall having one or more curves, adjacent curves having abrupt or gradual changes from curve to curve. The wall structure is divided into at least one section, although the wall could include any number of sections. A section as used herein refers to vertical portions of a wall structure, each having a front wall, a back wall (or more precisely, a portion of the back wall of the entire wall structure), and possibly internal structure in the space between the front wall and the back wall. Also, as used herein, a wall structure means both a base (or base board or cove base) for attachment to or near the bottom of a wall, and a base that could be attached higher up on a wall, such as a chair rail to protect a wall from the back of a chair. Each section has a front contour associated with it. Contour refers to the outline of the front wall of a section and includes the edges or lines that define a shape for the section. The contour may be flat, curved or have any number of regular or irregular curves, planar sections or any other shapes associated with it. The contour could include a millwork appearance. In the various embodiments of the present wall structure, the rear wall of each section is flat from the bottom of the wall structure to the top of the wall structure. This flat rear wall section abuts the wall of the room where the wall structure is installed.

When in use, i.e. installed against a wall, the wall structure includes a top portion, intermediate portion and bottom portion. The top portion may have a hollow bead extending along the length of the top portion of the structure, and is defined by the top portion of the overall back wall and the top portion of the overall front wall. The intermediate portion includes part of the overall front wall, and may be all or partially flat and parallel with the overall back wall.

The wall structure would often be attached to a wall with the bottom of the wall structure slightly above the floor for receiving flooring such as tile, carpeting, planks, etc. beneath the bottom. In a preferred embodiment, the wall structure is extruded and contains voids or hollowed out spaces which are defined by interior surfaces and generally following the exterior shape of the wall structure, having supports between the front wall and rear or back wall for supporting the walls during the molding process to keep them from collapsing or being warped while the plastic is hot, and thereafter as it cools. However, the wall structure appears to be solid when viewed from the front or from any angle. The voids are provided to yield a product having generally a general uniform thickness throughout for substantially uniform rates of heat flow during the heating and cooling incurred during the extrusion process, while having the heated fluid plastic material flow to all parts of the wall structure during the extrusion process. In other words, the general uniform thickness is the thickness that the walls do not distort during molding, which generally means the same thickness. When the wall structure is installed in a room, the cavities created by these voids, chambers or hollowed out spaces can hold various electrical and other conduits, which are threaded through a selected space. The thickness of the walls must be thick enough to absorb impact after attachment to a wall without breaking or becoming deformed, and many moldable plastic materials have the strength and resiliency to provide a thickness for having these characteristics. The supports extending transversely in the space between the rear wall and front wall provide support against prolonged or impact forces on the front wall to prevent buckling, indention or piercing of the front wall. Strength of the walls of the present wall structure is very important for its intended uses. It has been found that sturdy walls in the inventive wall structure have a general uniform thickness in the range of 0.3 cm to 0.5 cm (0.125 to 0.2 inches), and can be extrusion molded without warping or other distortion.

As explained above, even though the components of the inventive wall structure have a generally uniform thickness, the wall structure nevertheless gives the impression that it has parts of varying thickness. The voids or spaces are preferably contoured to have the same configuration as the exterior of the part of the wall structure in which the space is located, to provide each of the walls with the general uniform thickness to prevent warping of the walls during their heating and cooling during the extrusion process. Stated another way, the interior of the wall structure has a contour that corresponds to and is substantially the same as the contour of the exterior or the wall structure. "Corresponding to" means the surfaces match up with each other to form a generally uniform wall thickness as shown, for example, in FIG. 1. The spaces do not necessarily have to be the same shape as the walls surrounding them. For example, FIG. 1 shows a generally semi-hemispheric top bead 23 described further below, having a cylindrical space 25, but the walls are generally a general uniform thickness of the wall structure.

Referring to the drawings, which are used for illustration and not to limit the invention therewith, FIG. 1 shows one embodiment of the present invention. A wall structure 2 is comprised of a resilient, slightly flexible plastic. The wall structure 2 has an overall rear wall 4, an overall front wall 6, a top wall 8 and a bottom wall 10. Overall rear wall 4 is placed against a wall or other flat surface while bottom wall 10 is placed against the floor or flooring surface. Overall rear wall 4 has a continuous flat surface rear exterior surface. Overall rear wall 4 also has a rear interior surface. The rear exterior surface and the rear interior surface of overall rear wall 4 defines the general uniform thickness of wall structure 2. Overall front wall 6 has a front exterior surface and a front interior surface. The front exterior surface and a front interior surface of overall front wall 6 defines the general uniform thickness as well. Since the angle between the floor and the wall is typically between 85 and 95 degrees, bottom wall 10 can have an incline or angle (not shown) for accommodating this irregularity. Typically, this angle is around 5 degrees. Bottom wall 10 may be angled or inclined so that its intersection with overall rear wall 4 is above or below its intersection with front wall 6, when overall rear wall 4 is in the vertical position.

Wall structure 2 of FIG. 1 is divided into a first section 12 and a second section 14. First section 12 is located on top of second section 14. Each section 12, 14 has a contour associated with it. First section 12 includes a first rear wall 16 and a first front wall 18. First rear wall 16 has a first rear exterior surface 20 and a first rear interior surface 22. The distance between first rear exterior surface 20 and first rear interior surface 22 is generally the uniform thickness of wall structure 2. First front wall 18 has a first front exterior surface 24 and a first front interior surface 26, the distance between the two generally being the general uniform thickness of wall structure 2. First front exterior surface 24 has a contour. First front interior surface 26 also has a contour which corresponds to and is substantially the same as the contour of first front exterior surface 24.

First section 12 also has a top interior surface 29 located away from second section 14. Top interior surface 29 interconnects first rear interior surface 22 and first front interior surface 26. A support wall 31 located next to second section 14 has a first connecting upper surface 33 connecting first rear interior surface 22 and first front interior surface 26. Top interior surface 29 and first front interior surface 26 could be extensions of each other, could be separate surfaces or could in effect be the same surface. Support wall 31 also has a first connecting lower surface 35. The intersection of first rear interior surface 22, first front interior surface 26, top interior surface 29 and first connecting upper surface 33 defines a top section space or top defined space 30. Although not shown, transverse support walls can divide top section space 30 into multiple spaces. Furthermore, first section 12 can have multiple spaces in addition to top section space 30 without transverse support walls.

Second section 14 has a second rear wall 32 with a second rear exterior surface 34 and a second rear interior surface 36. The distance between the second rear exterior surface 34 and second rear interior surface 36 defines the general uniform thickness of wall structure 2. Second section 14 also has a second front wall 38 including a second exterior surface 40 and a second front interior surface 42. The distance between second front exterior surface 40 and second front interior surface 42 is generally the general uniform thickness of wall structure 2. Second front exterior surface 40 has a contour associated with it. Second front interior surface 42 has a contour corresponding to and being substantially the same as the contour of second front exterior surface 40.

Second section 14 can also include at least one support wall 28 extending between second front interior surface 42 and second rear interior surface 36 for supporting second front wall 38 and second rear wall 32, and these support walls 28 are shown. Support wall 28 has a second connecting upper surface 37 and a second connecting lower surface 39. Support walls 28 help to keep wall structure 2 in an upright position when installed against a wall. Support walls 28 also prevent warping of wall structure 2 during the extrusion molding process as explained earlier. Support walls 28, second front interior surface 42 and second rear interior surface 36 define at least one second section space, second defined space or void 48. Additionally, the intersection of at least one support wall 28, second front interior surface 42, second rear interior surface 36 and a second bottom interior surface 46 can also define at least one section space 48. The thickness of support walls 28 is generally the general uniform thickness of wall structure 2.

Second bottom interior surface 46, forming the top of bottom wall 10, connects second rear interior surface 36 and second front interior surface 42 near the bottom of second section 14. Bottom wall 10 has a thickness which is generally equal to the general uniform thickness of wall structure 2. Second section 14 has at least one second section space or void 48 having a different size and/or shape from the shape of first section space 30.

FIG. 1 shows a generally semi-hemispheric top bead 23 located directly above first section 12. Top bead 23 has a cylindrical space 25, but the walls are generally the general uniform thickness of the wall structure 2.

Stated another way, wall structure 2, when in use, can be divided into a top portion, an intermediate portion and a bottom portion. The top portion includes top wall 8. The bottom portion includes bottom wall 10. The intermediate flat portion includes the flat structure of wall structure 2 located above and below or between the top portion and the bottom portion. The portion of overall front wall 6 above and adjacent to the intermediate flat portion has a millwork appearance.

In an embodiment not shown, first section 12 of the wall structure can be located below second section 14, which is the opposite configuration of FIG. 1. That is, first section 12 would be a lower portion of wall structure 2 and second section 14 would be an upper portion of wall structure 2. As previously mentioned, more than one first section 12 can be combined with second section 14. For example, a wall structure can have first section 12 as a lower and upper portion of the wall structure and second section 14 as a middle portion in between the lower and upper portion of the wall structure. Alternatively, more than one second section 14 can be combined with first section 12, i.e. a wall structure can have second section 14 as a lower and upper portion of the wall structure and first section 12 as a middle portion in between the lower and upper portion of the wall structure. Finally, multiple first sections 12 can be combined with multiple second sections 14 to form any number of various wall structure configurations. For example, more than one second section 14 can be combined with more than one first section 12, i.e. a wall structure can have second section 14 as a lower portion, a first section 12 located immediately above second section 14, another second section 14 located immediately above first section 12, and another first section 12 as an upper portion of the wall structure located immediately above previous second section 14.

In another embodiment of the present invention, wall structure 102 can be also divided into three sections as seen in FIGS. 2 and 3, although any number of sections can be included. As in the previous embodiment, wall structure 102 has an overall rear wall 103, an overall front wall 105, a bottom wall 107 and a top wall 109. Overall rear wall 103 has a continuous flat surface rear exterior surface. Overall rear wall 103 also has a rear interior surface. The rear exterior surface and the rear interior surface of overall rear wall 103 defines the general uniform thickness of wall structure 102. Overall front wall 105 has a front exterior surface and a front interior surface. The front exterior surface and a front interior surface of overall front wall 105 define the general uniform thickness as well. FIG. 2 shows the unit on a wall, since one could see the spaces when the end is shown. FIG. 3 shows a side, cross-sectional view of wall structure 102 taken in the direction 3-3, with spaces or voids being visible. FIGS. 2 and 3 show a first section 104, a second section 106 and a third section 108. First section 104 is the same as first section 12 shown in FIG. 1. Similarly, second section 106 is the identical to second section 14 shown in FIG. 1. Therefore, the details of these sections 104, 106 will not be discussed here, and reference is made to earlier descriptions thereof. Third section 108 is located below second section 106. Third section 108 includes a third rear wall 110 having a third rear exterior surface 112 and a third rear interior surface 114 where the thickness of third rear wall 110 is generally the general uniform thickness of wall structure 102. Third section 108 has a third front wall 116 which includes a third front exterior surface 118 and a third front interior surface 120. Third front exterior surface 118 has a contour associated with it. Third front interior surface 120 includes a contour corresponding to and being substantially the same as the contour of third front exterior surface 118. The distance between third front exterior surface 118 and third front interior surface 120 is generally the general uniform thickness of wall structure 102.

Third section also has third support walls 122 extending between third front interior surface 120 and third rear interior surface 114. The thickness of third support walls 122 is generally the general uniform thickness of wall structure 102, which is the distance between first rear exterior surface 20 and first rear interior surface 22. Third section 108 also includes a third top wall 124 having a third top interior surface 125 which connects to second section 106. A third bottom wall 126 functioning as the bottom of wall structure 102, has a third bottom interior surface 127, which connects third rear interior surface 114 and third front interior surface 120. Optionally, and as shown in FIG. 3, third bottom wall 126 is inclined or angled. This angle is typically around 5 degrees measured relative to the floor. Third bottom wall 126 may be angled from third front wall 116 to rear wall 110 with the front intersection of third bottom wall 126 and third front wall 116 being lower than the intersection of bottom wall 126 and third rear wall 110 when third rear wall 110 is vertical, or vice versa.

Third section 108 also includes third section spaces, third defined spaces or voids 128. Third support walls 122 have third bottom interior surfaces 129 and third top interior surfaces 131. Third section spaces 128 are defined by the respective third top interior surfaces 125, 131, respective third bottom interior surfaces 127, 129, third rear interior surface 114 and third front interior surface 120. Third section spaces 128 have a different size and/or shape from at least one of the shapes of first section space 30 or second section spaces 48.

Stated another way, wall structure 102, when in use, can be divided into a top portion, an intermediate portion and a bottom portion. As in the previous embodiment, wall structure 102 has an overall rear wall 103, an overall front wall 105, a bottom wall 107 and a top wall 109. The top portion includes top wall 109. The bottom portion includes bottom wall 107. The intermediate flat portion includes the flat structure of wall structure 102 located above and below or between the top portion and the bottom portion. Part of wall structure 102 having the flat intermediate portion has support walls 45 and at least two defined spaces 48 defined by support walls 45, wherein the bottom portion of overall front wall 105 adjacent to the intermediate flat portion has a millwork appearance. The bottom portion of wall structure 102 has defined spaces 128 different in configuration from defined spaces 48 in part of wall structure 102 having the intermediate flat portion.

As seen in FIG. 3, third section 108 has a different contour than the contour of either first section 104 or second section 106 or both. Although not shown, any number of combinations of first section 104, second section 106 and third section 108 can be included to form various wall structure configurations. For example, first section 106 can be located between second section 106 and third section 108. First section 104 can also be located below third section 108. That is, first section 104 would be a lower portion of the wall structure while third section 108 would be a middle portion and second section 106 would be an upper portion. Also, second section 106 can be located below third section 108. That is, second section 106 would be a lower portion of the wall structure while third section 108 would be a middle portion and first section 106 would be an upper portion. Alternatively, more than one first section 104 can be combined with second section 106 and third section 108. For example, a wall structure can have third section 14 as a lower portion, a first section 104 located immediately above third section 108, a second section 106 located immediately above first section 104, and another first section 104 as an upper portion of the wall structure located immediately above previous second section 106. Furthermore, more than one second section 106 can be combined with first section 104 and third section 108 similar to the embodiment described with the additional first section 104. Additionally, more than one third section 108 can be combined with first section 104 and second section 106 as well. Finally, multiple first sections 104 can be combined with multiple second sections 106 and multiple third sections 108 to form any number of various wall structure configurations in a manner similar to those just described.

Figures 4, 5:
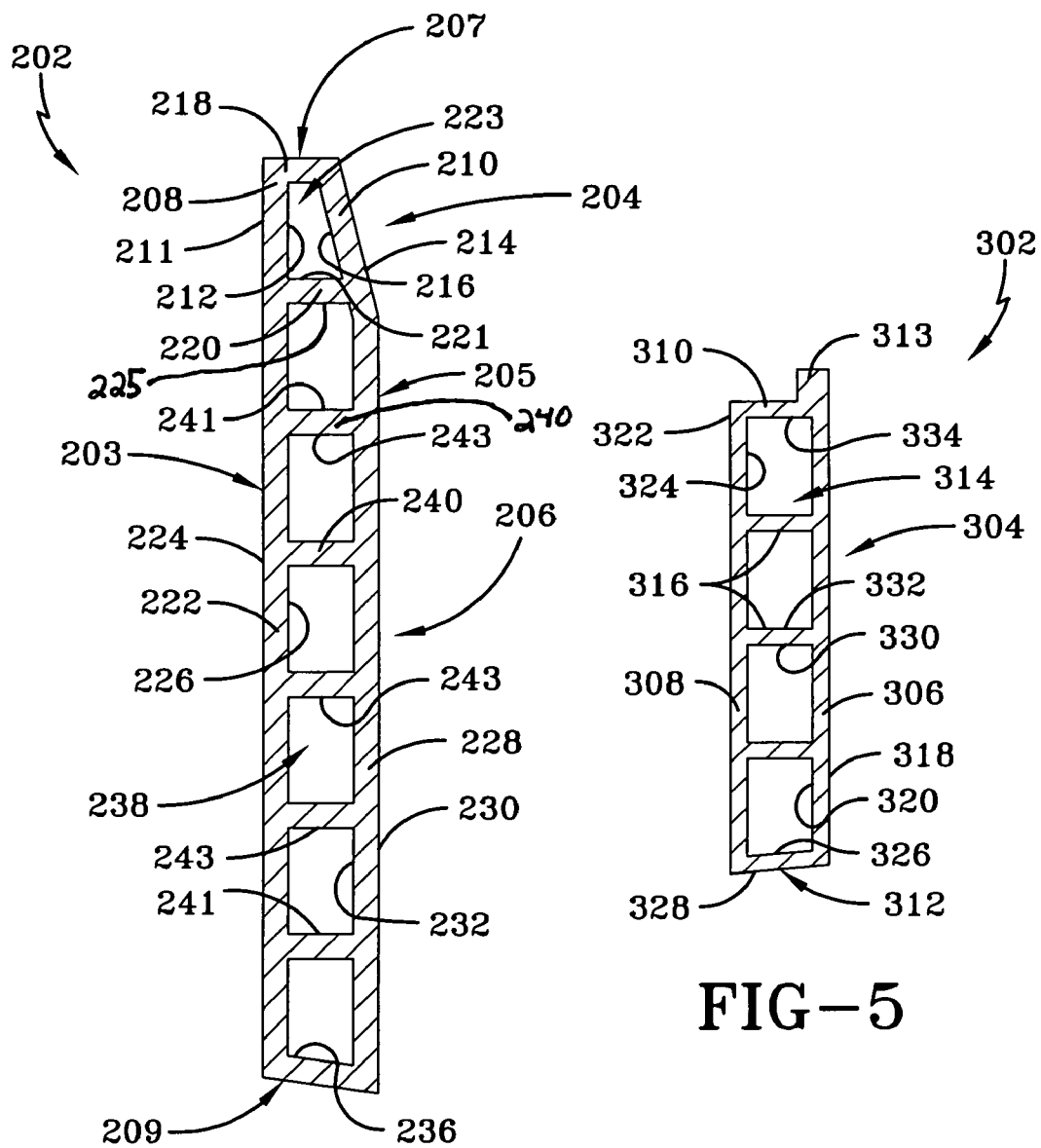
FIG. 4 shows a side, cross-sectional view of yet another embodiment of the present invention.
FIG. 5 shows a side, cross-sectional view of still another embodiment of the present invention.

FIG. 4 shows a side view of yet another embodiment of the present invention which is similar to FIG. 1. A wall structure 202 has an overall rear wall 203, an overall front wall 205, a top wall 207 and a bottom wall 209. Overall rear wall 203 has a continuous flat surface rear exterior surface. Overall rear wall 203 also has a rear interior surface. The rear exterior surface and the rear interior surface of overall rear wall 203 defines the general uniform thickness of wall structure 202. Overall front wall 205 has a front exterior surface and a front interior surface. The front exterior surface and a front interior surface of overall front wall 205 defines the general uniform thickness as well. The rear wall 203 is placed against a wall or other flat surface while bottom wall 209 is placed against the floor or flooring surface.

Wall structure 202 is divided into a first section 204 and a second section 206. First section 204 is located on top of second section 206. Each section 204, 206 has a contour associated with it. First section 204 includes a first rear wall 208 and a first front wall 210. First rear wall 208 has a first rear exterior surface 211 and a first rear interior surface 212. The distance between first rear exterior surface 211 and first rear interior surface 212 is generally the uniform thickness of wall structure 202. First front wall 210 has a first front exterior surface 214 and a first front interior surface 216, the distance between the two generally being the general uniform thickness of wall structure 202. First front exterior surface 214 has a contour. First front interior surface 216 also has a contour which corresponds to and is substantially the same as the contour of first front exterior surface 214. The distance between first front exterior surface 214 and first front interior surface 216 is generally the general uniform thickness of wall structure 202.

First section 204 also has a first top interior surface 218 located away from second section 206. First top interior surface 218 interconnects first rear interior surface 212 and first front interior surface 216. First top interior surface 218 is the interior surface of top wall 207 of wall structure 202. A support wall 220 extending between first front wall 210 and first rear wall 208 is located next to second section 206, and has a first connecting upper surface 221 which connects first rear interior surface 212 and first front interior surface 216. Top interior surface 218 and first front interior surface 216 could be extensions of each other, could be separate surfaces or could in effect be the same surface. Support wall 220 also has a first connecting lower surface 225. The combination of first rear interior surface 212, first front interior surface 216, first top interior surface 218 and first connecting upper surface 221 defines a top section space or top defined space 223. Although not shown, transverse support walls can divide top section space 223 into multiple spaces. Furthermore, first section 204 can have multiple spaces in addition to top section space 223 without transverse support walls.

Second section 206 has a second rear wall 222 with a second rear exterior surface 224 and a second rear interior surface 226. The distance between second rear exterior surface 224 and second rear interior surface 226 defines the general uniform thickness of wall structure 202. Second section 206 also has a second front wall 228 including a second front exterior surface 230 and a second front interior surface 232. The distance between second front exterior surface 230 and second front interior surface 232 is generally the general uniform thickness of wall structure 202. Second front exterior surface 230 has a contour associated with it. Second front interior surface 232 has a contour corresponding to and being substantially the same as the contour of second front exterior surface 232.

A second bottom interior surface 236 connects second rear interior surface 226 and second front interior surface 232 near the bottom of second section 206. Second bottom interior surface 236 has a thickness which is generally equal to the general uniform thickness of wall structure 202. Second bottom interior surface 236 is the upper surface of bottom wall 209 of wall structure 202, and can be inclined or angled to accommodate the angle between the floor and the wall which is typically between 85 and 95 degrees as mentioned above with respect to the embodiment of FIGS. 2 and 3, and as seen in FIG. 4. Typically, this angle is around 5 degrees. The nature of the angle may change as was also discussed above with respect to FIGS. 2 and 3.

Second section 206 can also include at least one support wall 240 extending between second rear wall 222 and second front wall 228. Each support wall 240 has a second connecting upper surface 241 and a second connecting lower surface 243. Each of second connecting upper surface 241 and second connecting lower surface 243 extend between second front interior surface 232 and first rear interior surface 226 to define second section spaces, second defined spaces or voids 238. These support walls 240 help to keep wall structure 202 in an upright position when installed against a wall. Support walls 240 also prevent warping of wall structure 202, especially during the molding process at elevated temperatures. Support walls 240 define at least one second section space or void 238. The thickness of support walls 240 is generally the general uniform thickness of wall structure 202. Second section spaces, second defined spaces or voids 238 have a different size and/or shape from the shape of first section space 223.

Stated another way, wall structure 202, when in use, can be divided into a top portion, an intermediate portion and a bottom portion. The top portion includes top wall 207. The bottom portion includes bottom wall 209. The intermediate portion is flat and includes the structure of wall structure 202 located above and below or between the top portion and the bottom portion. A portion of overall front wall 205 above and adjacent to the intermediate flat portion is flat and inclined relative to the intermediate flat portion.

In an embodiment not shown, first section 204 of the wall structure 202 can be located below second section 206, which is the opposite configuration of FIG. 4. That is, first section 204 would be a lower portion of wall structure 202 and second section 206 would be an upper portion of wall structure 202. As previously mentioned, more than one first section 204 can be combined with second section 206. For example, a wall structure can have first section 204 as a lower and upper portion of the wall structure and second section 206 as a middle portion in between the lower and upper portion of the wall structure. Alternatively, more than one second section 206 can be combined with first section 204, i.e. a wall structure can have second section 206 as a lower and upper portion of the wall structure and first section 204 as a middle portion in between the lower and upper portion of the wall structure. Finally, multiple first sections 204 can be combined with multiple second sections 206 to form any number of various wall structure configurations. For example, more than one second section 206 can be combined with more than one first section 204, i.e. a wall structure can have second section 206 as a lower portion, a first section 204 located immediately above second section 206, another second section 206 located immediately above first section 204, and another first section 204 as an upper portion of the wall structure located immediately above previous second section 206.

FIG. 5 shows another embodiment of the present invention. Wall structure 302 is shown having a single section 304. Wall structure 302 has an overall rear wall 308, an overall front wall 306, a top wall 310 and a bottom wall 312. An upstanding flange 313 extends upwardly from the rear part of top wall 310. Overall rear wall 308 is placed against a wall or other flat surface while the bottom wall 312 is placed against the floor or flooring surface. Since the angle between the floor and the wall is typically between 85 and 95 degrees, bottom wall 312 can have an incline or angle for accommodating this irregularity. Typically, this angle is around 5 degrees. The nature of the incline was discussed with respect to FIGS. 2 and 3, and reference is made thereto. Wall structure 302 includes spaces or voids 314 which are defined by support walls 316, top wall 310 and bottom wall 312. When viewed from a side view as shown in FIG. 5, bottom wall 312 has a bottom interior surface 326 and bottom exterior surface 328, each of which is a planar surface which has a length greater than the length of respective top interior surfaces 330 and bottom interior surfaces 332 of at least one support wall 316, or of a top interior surface 334 of top wall 310.

Overall rear wall 308 has a rear exterior surface 322 and a rear interior surface 324. Rear exterior surface 322 is continuous and flat. The distance between rear exterior surface 322 and rear interior surface 324 is generally the uniform thickness of wall structure 302. Overall front wall 306 has a front exterior surface 318 and a front interior surface 320, the distance between the two generally being the general uniform thickness of wall structure 302. Cavities 314 are defined by respective top interior surfaces 330, 334, respective bottom interior surfaces 326, 332, rear interior surface 324 and front interior surface 320. Front exterior surface 318 has a contour. Front interior surface 320 also has a contour which corresponds to and is substantially the same as the contour of front exterior surface 318. The distance between front exterior surface 318 and front interior surface 320 is generally the general uniform thickness of wall structure 302.

Stated another way, wall structure 302, when in use, can be divided into a top portion, an intermediate portion and a bottom portion. The top portion includes top wall 310. The bottom portion includes bottom wall 312. The intermediate portion includes the structure of wall structure 302 located above and below or between the top portion and the bottom portion. Overall front wall 306 includes part of the top portion, the bottom portion and intermediate portion. Overall front wall 306 in each of the top portion, bottom portion and intermediate portion is flat and parallel with overall rear wall 308.

Although not shown, more than one first section 304 may be combined to create various wall structure configurations. For example, first section 304 may be a lower portion of the wall structure and another first section 304 may be the upper portion of the wall structure located directly above the lower portion. Yet another example is where three first sections 304 are combined, i.e. each section 304 located on top of the previous section 304 to create a larger wall structure.

Figures 6, 7:
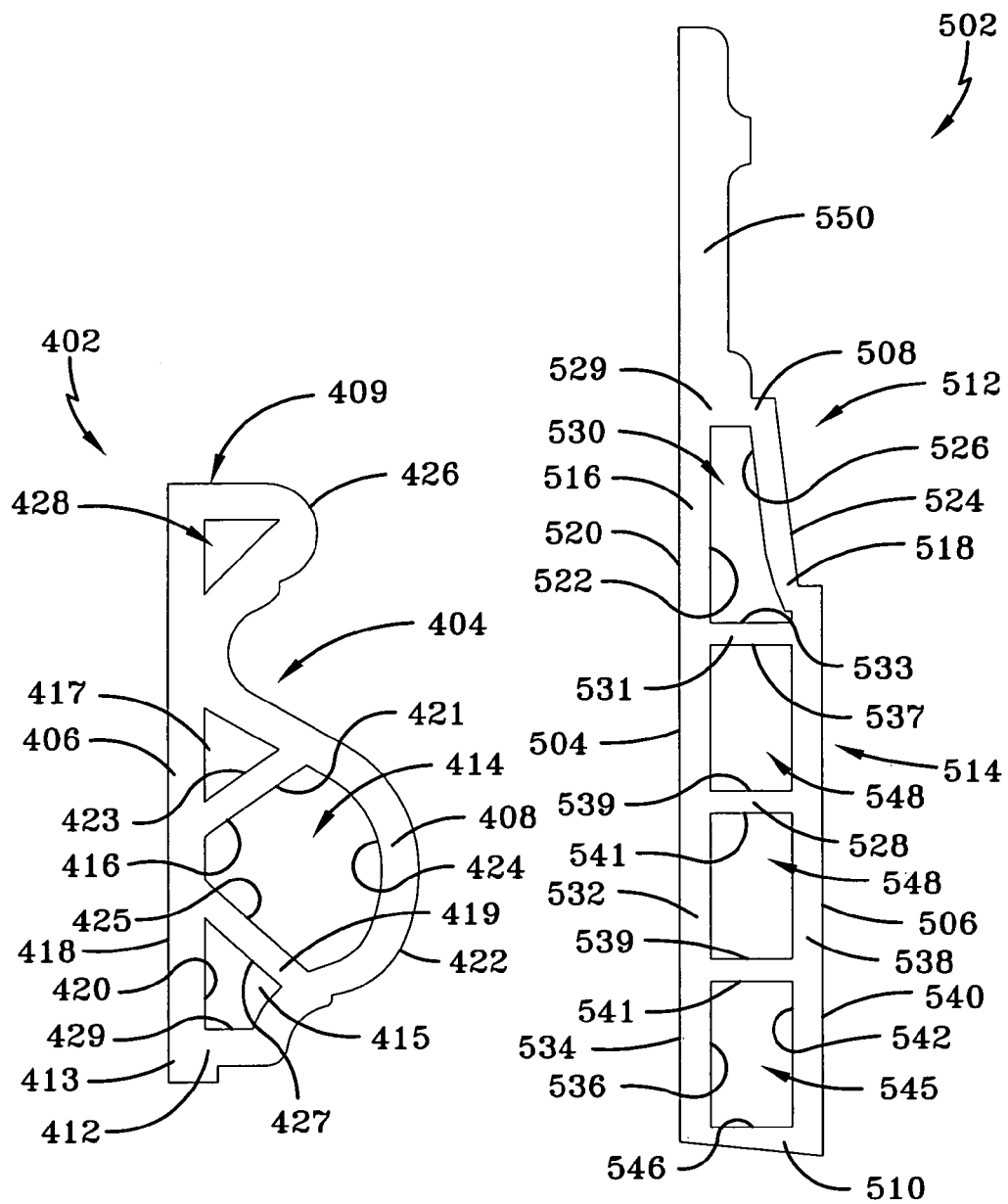
FIG. 6 is a side, cross-sectional view of another embodiment of the present invention.
FIG. 7 is a side, cross-sectional view of yet another embodiment of the present invention.

FIG. 6 shows yet another embodiment of the present invention. Wall structure 402, which functions as a chair rail, is shown having a single section 404. Wall structure 402 has an overall rear wall 406, an overall front wall 408, a top wall 409 and a bottom wall 412 with a bottom piece 413 depending therefrom. The rear wall 406 is placed against a wall or other flat surface. Wall structure 402 includes spaces or voids 414, 415 and 417 which are formed by a pair of angled support walls 416, 419; rear wall 406 and front wall 408. Angled support walls 416, 419 help support front wall 408 from impacts when installed against a wall. Support walls 416, 419 also prevent warping of wall structure 402, as during the molding process. The term "angled" means that the angle between the support walls 416, 419 and rear wall 406 is not 90 degrees with respect to rear wall 406, as shown in FIG. 6. The thickness of support walls 416, 419 is generally the general uniform thickness of wall structure 402.

Angled support walls 416, 419 are used to obtain the desired support for front wall 408, to provide a sturdier support than, for example, would be provided by a single support wall going to part of front wall 408 which extends furthest from back wall 406. In order to maintain the uniform thickness of the walls and support walls of wall structure 402, two additional cavities 415, 417 had to be formed. Support wall 416 has a first interior surface 421 defining part of cavity 414, and a second interior surface 423 defining, along with a rear interior surface 420 of rear wall 406 and front interior surface 424, cavity 417. Likewise, support wall 419 has a first interior surface 425 forming part of cavity 414, and a second interior surface 427 defining, along with a rear interior surface 420 of rear wall 406, front interior surface 424, and a bottom wall interior surface 429, cavity 415.

Rear wall 406 has a rear exterior surface 418 and rear interior surface 420. The distance between rear exterior surface 418 and rear interior surface 420 is generally the uniform thickness of wall structure 402. Front wall 408 has a front exterior surface 422 and front interior surface 424, the distance between the two generally being the general uniform thickness of wall structure 402. Front exterior surface 422 has a contour. Front interior surface 424 also has a contour which corresponds to and is substantially the same as the contour of front exterior surface 422.

FIG. 6 shows a top bead 426 having a triangular space 428. Top bead generally has a thickness equal to the general uniform thickness of wall structure 402.

Stated another way, wall structure 402, when in use, can be divided into a top portion, an intermediate portion and a bottom portion. The top portion includes top wall 409. The bottom portion includes bottom wall 412 and bottom piece 413. The intermediate portion includes the structure of wall structure 402 located above and below or between the top portion and the bottom portion. A portion of overall front wall 408 has a millwork appearance, wherein support walls 416, 419 extending between the portion of overall front wall 408 having a millwork appearance and overall rear wall 406 is not perpendicular to overall back wall 406.

Although not shown, more than one first section 404 may be combined to create various wall structure configurations. For example, first section 404 may be a lower portion of the wall structure and another first section 404 may be the upper portion of the wall structure located directly above the lower portion. Yet another example is where three first sections 404 are combined, i.e. each section 404 located on top of the previous section 404 to create a larger wall structure.

FIG. 7 shows another embodiment of the present invention which is similar to FIG. 1. Wall structure 502 is shown in FIG. 7. Wall structure 502 has an overall rear wall 504, an overall front wall 506, a top wall 508 and a bottom wall 510. Overall rear wall 504 is placed against a wall or other flat surface while the bottom wall 510 is placed against the floor or flooring surface. Since the angle between the floor and the wall is typically between 85 and 95 degrees, bottom wall 510 can have an incline or angle as shown for accommodating this irregularity. Typically, this angle is around 5 degrees. The nature of the incline was discussed above with reference to FIG. 1, and reference is made thereto.

Wall structure 502 of is divided into a first section 512 and a second section 514. First section 512 is located on top of second section 514. Each section 512, 514 has a contour associated with it. First section 512 includes a first rear wall 516 and a first front wall 518. First rear wall 516 has a first rear exterior surface 520 and a first rear interior surface 522. The distance between first rear exterior surface 520 and first rear interior surface 522 is generally the uniform thickness of wall structure 502. First front wall 518 has a first front exterior surface 524 and a first front interior surface 526, the distance between the two generally being the general uniform thickness of wall structure 502. First front exterior surface 524 has a contour. First front interior surface 526 also has a contour which corresponds to and is substantially the same as the contour of first front exterior surface 524.

First section 512 also has a top interior surface 529 located away from second section 514. Top interior surface 529 interconnects first rear interior surface 522 and first front interior surface 524. A support wall 531 extends between a second rear wall 532 and a second front wall 538, both of which are discussed below. Support wall 531 has a first connecting upper surface 533 located next to second section 514. Support wall 531 also has a first connecting lower surface 537. First connecting upper surface 533 also connects first rear interior surface 522 and first front interior surface 526. Top interior surface 529 and first front interior surface 524 could be extensions of each other, could be separate surfaces or could in effect be the same surface. The combination of first rear interior surface 522, first front interior surface 526, top interior surface 529 and first connecting upper surface 533 defines a top section space or top defined space 530. Although not shown, transverse support walls can divide top section space 530 into multiple spaces. Furthermore, first section 512 can have multiple spaces in addition to top section space 530 without transverse support walls.

Second section 514 has second rear wall 532 with a second rear exterior surface 534 and a second rear interior surface 536. The distance between the second rear exterior surface 534 and second rear interior surface 536 defines the general uniform thickness of wall structure 502. Second section 514 also has second front wall 538 including a second exterior surface 540 and a second front interior surface 542. The distance between second front exterior surface 540 and second front interior surface 542 is generally the general uniform thickness of wall structure 502. Second front exterior surface 540 has a contour associated with it. Second front interior surface 542 has a contour corresponding to and being substantially the same as the contour of second front exterior surface 540.

Second section 514 can also include at least one support wall 528 extending between second wall 538 and second rear wall 532 for supporting second front wall 538 and second rear Wall 532. Support walls 528 help to keep wall structure 502 in an upright position when installed against a wall. Support walls 528 also prevent warping of wall structure 502, particularly during the molding process. Support walls 528 help to form at least one second section space, second defined space or void 548. The thickness of support walls 528 is generally the general uniform thickness of wall structure 502. Support wall 531 has a top interior surface 537. Support walls 528 have bottom interior surfaces 539 and top interior surfaces 541.

A second bottom interior surface 546 connects second rear interior surface 536 and second front interior surface 542 near the bottom of second section 514. Bottom wall 510 has a thickness which is generally equal to the general uniform thickness of wall structure 502. Second section 514 has at least one second section space or void 548 having a different size and/or shape from the shape of first section space 530. Of the two spaces 548 shown, the one is defined by first connecting lower surface 537, bottom interior surface 539, rear interior surface 536 and front interior surface 542. Another space 545 is defined by top interior surface 541, bottom interior surface 546, second rear interior surface 536 and front interior surface 542. In an embodiment not shown, first section 512 of the wall structure can be located below second section 514, which is the opposite configuration of FIG. 7.

Wall structure 502 has an upstanding flange 550 located on top of first section 512. Upstanding flange 550 can be any number of different shapes or sizes, and adds aesthetic value to wall structure 502. For example, upstanding flange 550 can have slots, indentations, protrusions or the like and allow wall structure 502 to extend further up the wall when installed. Upstanding flange 550 creates an unlimited number of different wall structure configurations that can be used first section 512 and second section 514. It is possible that extension 550 may be located between first section 512 and second section 514. Furthermore, upstanding flange 550 may be below first 512 and second section 514. Upstanding flange 550 has a front to rear dimension which is nearly the same as the general uniform thickness of wall structure 502, wherefore damage from impact or warping during manufacture should not occur.

Stated another way, wall structure 502, when in use, can be divided into a top portion, an intermediate portion and a bottom portion. The top portion includes top wall 508. The bottom portion includes bottom wall 510. The intermediate portion includes the flat structure of wall structure 502 located above and below or between the top portion and the bottom portion. A portion of overall front wall 506 above the intermediate flat portion defines the front of a top defined space of wall structure 502, wherein the top defined space is partially defined by top wall 508 having upstanding flange 550 extending upwardly.

In an embodiment not shown, first section 512 of the wall structure 502 can be located directly below second section 514, which is the opposite configuration of FIG. 7. That is, first section 512 would be a lower portion of wall structure 502 and second section 514 would be an upper portion of wall structure 502. As previously mentioned, more than one first section 512 can be combined with second section 514. For example, a wall structure can have first section 512 as a lower and upper portion of the wall structure and second section 514 as a middle portion in between the lower and upper portion of the wall structure. Alternatively, more than one second section 514 can be combined with first section 512, i.e. a wall structure can have second section 514 as a lower and upper portion of the wall structure and first section 514 as a middle portion in between the lower and upper portion of the wall structure. Finally, multiple first sections 512 can be combined with multiple second sections 514 to form any number of various wall structure configurations. For example, more than one second section 514 can be combined with more than one first section 512, i.e. a wall structure can have second section 514 as a lower portion, a first section 512 located immediately above second section 514, another second section 514 located immediately above first section 514, and another first section 512 as an upper portion of the wall structure located immediately above previous second section 514.

Finally, any number of wall structure configurations can be created by any combination of the sections or sections previously discussed. In these embodiments which are not shown, the wall structure will have at least one section space, defined space or void having a different size and/or shape from the shape of at least one different section space.

Figure 8:
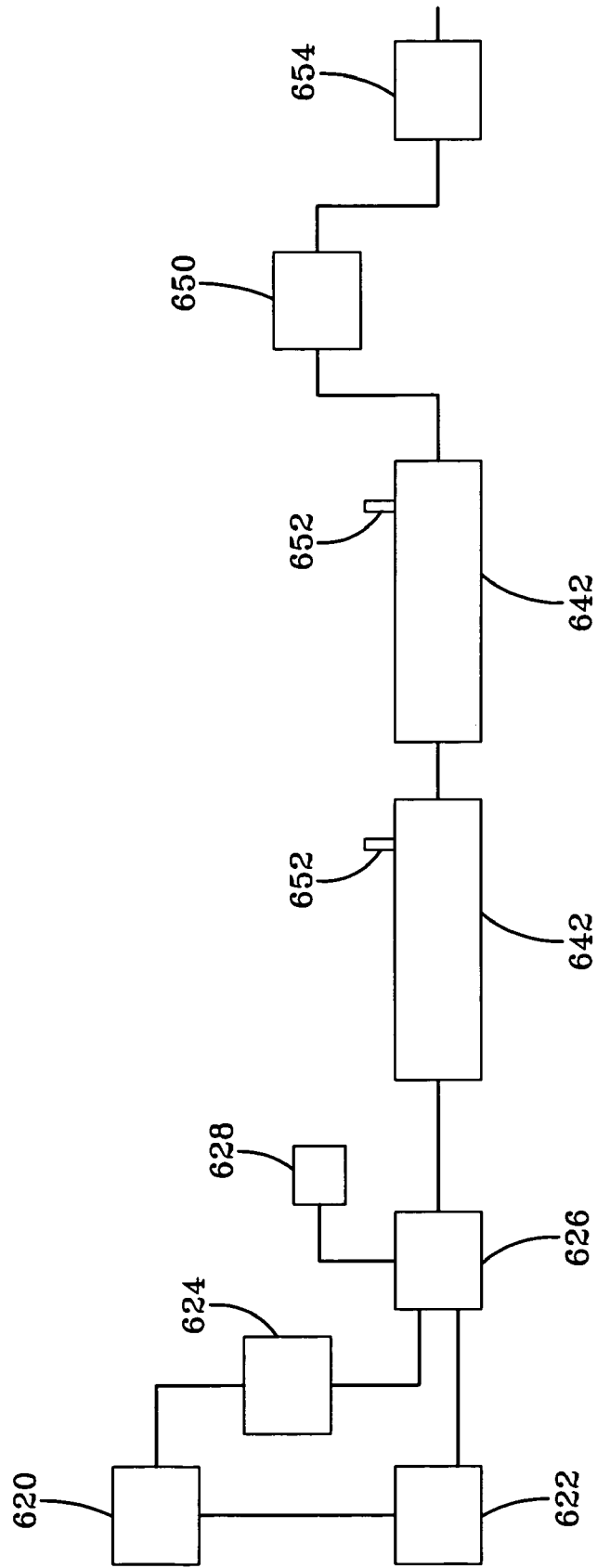
FIG. 8 is a schematic view of an assembly line for performing a manufacturing process according to a preferred embodiment of the invention.

Wall structure 2, 102, 202, 302, 402, 502 can be manufactured relatively quickly and easily because of its generally hollow core. The wall structure is made from a thermoplastic plastic material suitable for extrusion. The materials include those known in the art, such as any of the appropriate types of vinyl, PVC, or rubber (including synthetic rubber). Referring to FIG. 8, the raw materials are supplied to the extruders from a conventional supply unit 620. The plastic or similar material is preferably extruded from two separate extruders, a main extruder 622, and a side extruder 624 as shown in FIG. 8. Extruders 622, 624 can be standard extruders known in the art for manufacturing wall structures of similar configuration to that of wall structure 2, 102, 202, 302, 402, 502 although generally being of thinner configuration since the prior units were thicker. The main extruder 622 heats the raw material to put it into an extrudable state and extrudes through appropriate dies rear wall material 704 (FIG. 9) which makes up about 90% of the finished wall structure 2, 102, 202, 302, 402, 502. The side extruder 624 likewise heats the raw material to a fluid state and extrudes it through appropriate dies to yield a front wall material 706 shown in FIG. 9, preferably having a thickness of about 0.040 of very high quality material for a wall structure having a height of about 5.5 inches and a maximum thickness of about 0.75 inches. This is referred to as high quality material because it is a highly pigmented with no filler. This very high quality material represents about 10% of the finished wall structure material used. The softened plastic flow during extrusion does not cool sufficiently to impede further flow through the respective dies and along the extrusion production line. Because there is less plastic flowing through this system than found in the prior art, a multiple piece die 626 shown downstream of extruders 622, 624 stays hotter and thus the plastic flows quickly to reduce production time. The multiple piece die 626 is comprised of multiple machined parts that allow semi molten material to flow from the die. The extrusion material is forced through the die by the force generated by the extruder. As the material passes through the die 626, it is formed into the shape of the wall structure.

Figure 9:
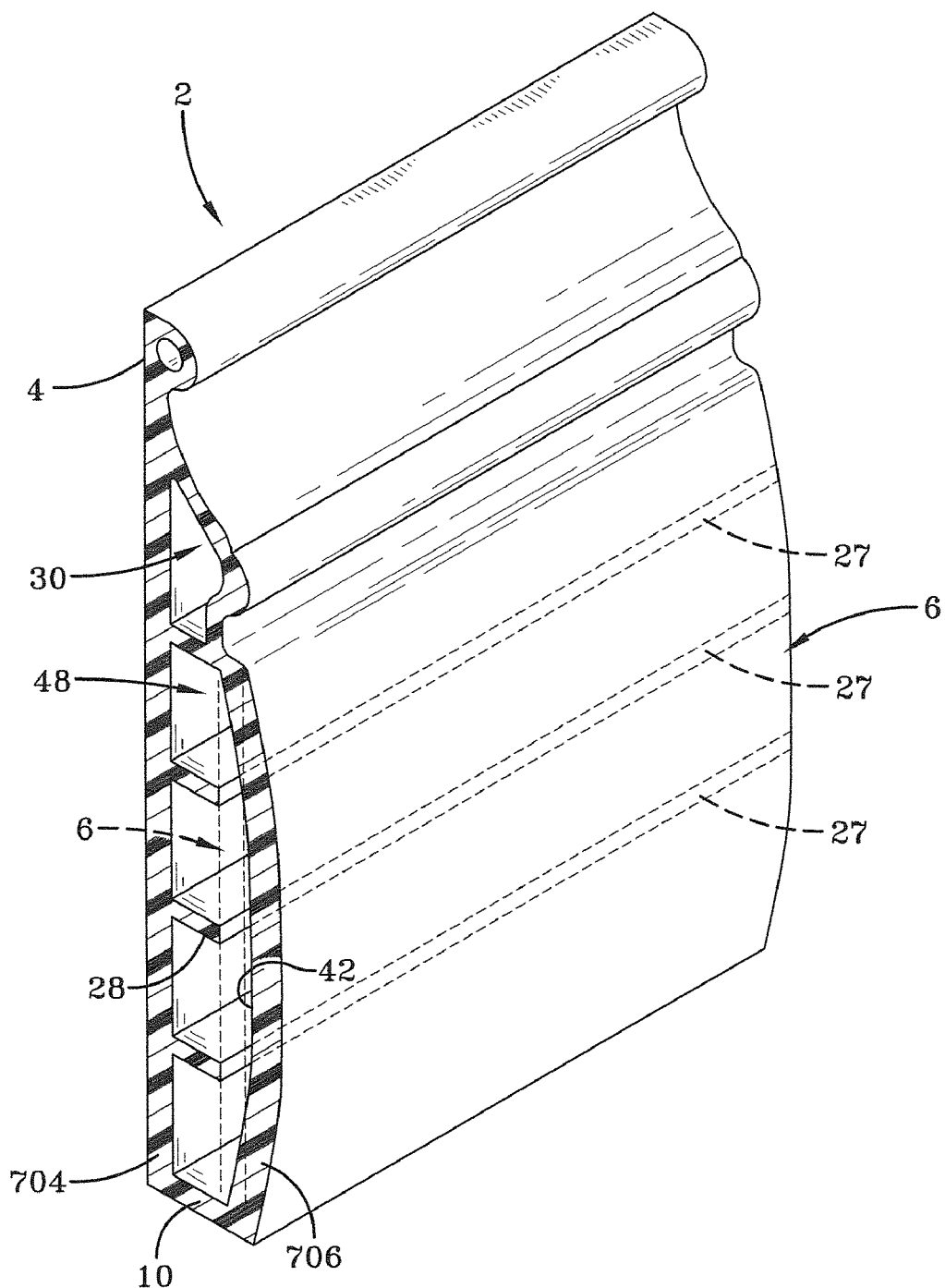
FIG. 9 is a perspective view of the wall structure of FIG. 1 during the extrusion process.

The method of forming the wall structure will not be described with respect to the embodiment of FIG. 1. The additional embodiments described above can be formed using a similar method. Die 626 establishes the profile of wall structure 2 by defining the shape of front wall 6 and rear wall 4, and the cavities 30, 48. As explained earlier, the cavities or voids 30, 48 make the finished product much lighter and easier to manipulate than a wood or solid plastic wall structure. In a preferred embodiment, the wall structure 2 is ¾ inches thick at the widest point and is 5.5 inches tall. The rear wall 4 can have a tactile surface for holding an adhesive for securing the wall structure to a wall. The tactile surface can include ribs, grooves, a mixture thereof or other surface roughness on its exterior face to which the adhesive could be applied during installation which would impede the flow of the adhesive from rear wall 4. Support walls 28 intersect front interior surface 42 at an interface 27 shown by the dotted lines, when support walls 28 meet front interior surface 42 and interface 27 is shown in FIG. 9.

The generally uniform wall thickness provides a fairly constant thickness for uniform cooling. However, the temperature must be low enough to prevent sagging under its own weight. Uniform cooling is required to obtain a smooth, finished look and profile of the wall structure.

The process used to create the hollow wall structure is preferably as follows, with reference to FIG. 8. Thermoplastic materials, such as vinyl, PVC or thermoplastic rubber, in the form of pellets, granules or powder from a supply unit 620 which is advantageously a pellet supplier, flow or are otherwise transported into both the main extruder 622 and the side extruder 624 which both feed into the multiple piece die 626 with a multi-functional insert 627 described below. As described above, the wall structure rear wall material 704 flows from main extruder 622 and front wall material 706 flows from side extruder 624. An air supply 628 is connected to the face of the die 626 to provide air pressure to assist in forming the spaces or chambers 30, 48 within the wall structure 2. The outer side or profile of the front wall 6 of the wall structure 2 is formed by the profile cut into or otherwise provided in the die 626, and the internal chambers are formed by the die insert 627 as described below.

Figure 10:
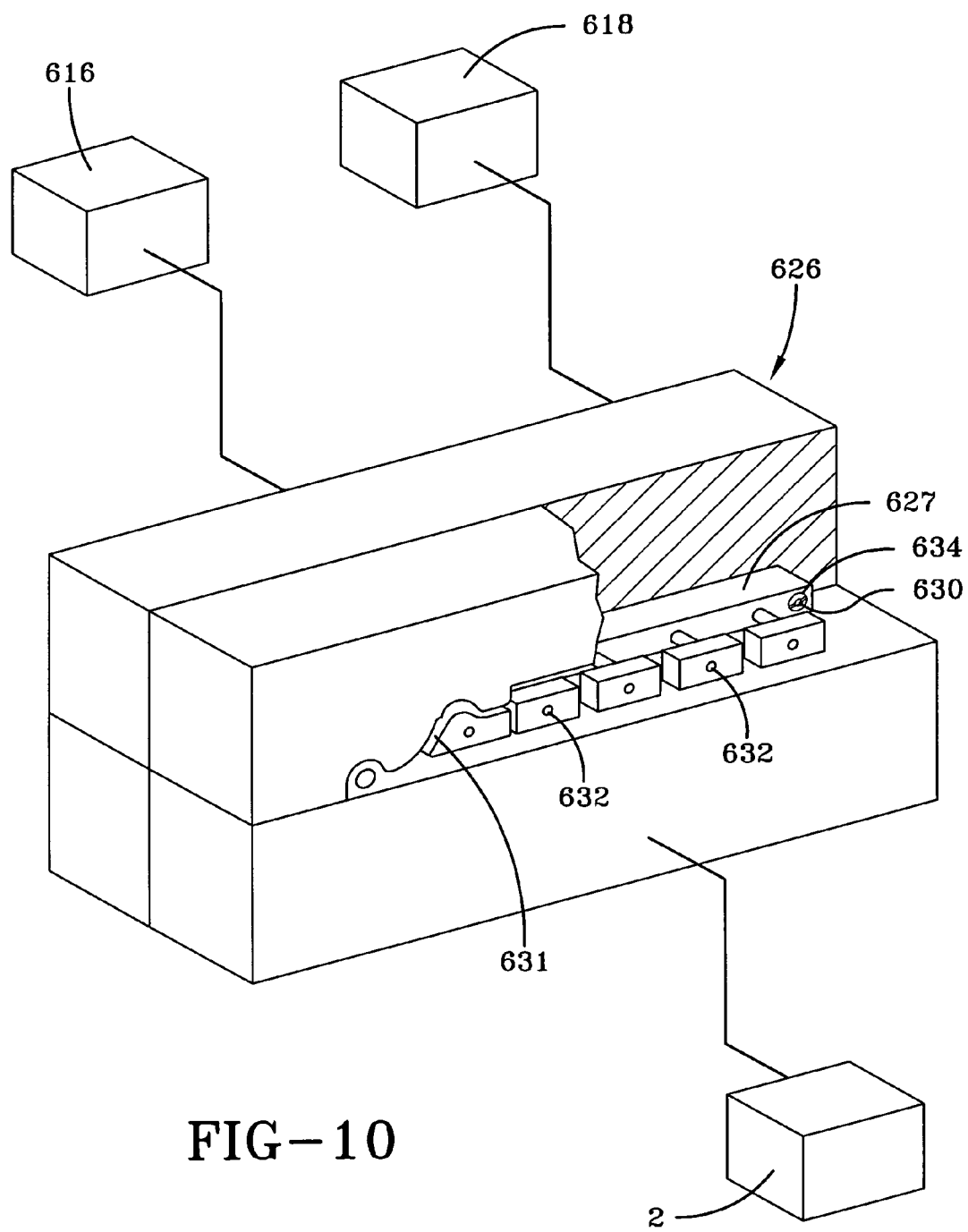
FIG. 10 is a detailed view of some of the apparatus of the assembly line shown in FIG. 8.

The insert 627 is attached to the die 626 by screws 634 within mounting holes, one on each side of the insert, as shown in FIG. 10. The insert 627 has a hollow back bar (not shown), allowing air to pass through the insert and into the forward facing ends of the die 626. There are two screws 634 that hold the insert 627 in place within the die 626. Each screw 634 is drilled through its length creating air inlets 630, and an air line is connected to one of the screw heads, generally on the right side of the die. The air passes through the screw, into the hollow back bar of the insert, and out through the holes 632 in the front of the insert 627.

The insert 627 is made up of machined parts, which are positioned to allow the softened fluid plastic material to flow around them to form both the profile and the various internal chambers 30, 48 of the wall structure 2, leaving voids in the areas of the machined parts. Turning first to the profile, a gap 631 is provided around insert 627 when it is mounted in die 626. Fluid plastic material, formed from both rear wall material 704 and front wall material 706 fused together, flow through the gap 631 to define the profile. The remainder of the rear wall material 704 flows around and encapsulates the insert 627. Second, to facilitate the internal chambers, compressed air is introduced from air supply 628 (FIG. 8) into the insert 627 through air inlets 630 and this air escapes through holes or air outlets 632 in the insert 627, into the hollow chambers 48 being formed of the wall structure. The addition of air from the air supply 628 helps the wall structure form its shape by allowing the base to collapse under its own weight while the material is still soft and not yet fixed or hardened into its permanent shape. This process is described in more detail below. The material must be cooled quickly in order for the material to retain its shape. Cooling the wall structure causes the material to harden and retain its shape.

Main extruder 622 can be a 6 inch Thermatic Davis Standard. The side extruder 624 can be a 2.5 inch Davis Standard. The die 626 can form wall structure 2 with one of various profiles such as a wedge-shaped base with a lip at the bottom, an undulating profile on a flat surface or the like, since insert 627 can be configured to produce numerous shapes which can have flat, regular or irregular curves, various inclines and the like. An embodiment of wall structure 2 shown in FIG. 1 has a flat second front exterior surface 40 of second section 14 and a first section 12 having a first front exterior surface with a contour different than the contour of second front exterior surface 40. A separate die is used for each style of profile.

Within the die 626, as shown in FIG. 8, the extruded solid plastic is formed into the desired profile with chambers 48. Material flows through die 626, and it takes from between 1 and 2 seconds for the material to enter and leave die 626. The temperature in the die is between 300° F. and 325° F. During this extrusion process, the front wall 6 is separated from the internal supporting members 28 momentarily for about 2 to 3 seconds by the addition of continuous air pressure of about 2 psi through the air inlets 630. Water is applied to cool the front wall 6 by running water over the front wall 6 through a series of water hoses in the cooling tanks 642. Cooling adds stability and flatness to the face. The cooling and loss of air pressure causes the front wall 6 to lower itself to the supporting members 28, resting upon them.

The wall structure rear wall material 704 and front wall material 706 are completely fused together in die 626, creating a fluid plastic material, through a combination of pressure created by the movement of material through the extruders and the resistance of that material moving through the restrictive opening in the die and the internal heat at a temperature of about 325° F. of the wall structure material. This generates a maximum pressure of about 3000 psi within the die.

The internal heat of the front wall 6 and the supporting members 28 fuses the front wall to the supporting members. The wall structure 2 material is pushed through and out of the die 626 under the pressures created by the extruders 622 and 624. As the wall structure is extruded, the internal chambers or voids 48 are clearly visible. The open end of the wall structure 2 (between the free ends of supporting members 28 and front wall 6), shown in FIG. 9, is closed by hand by pinching this open end between the thumb and fingers, to seal the chambers 48, because the material is still hot enough to stick to itself. Cooling water is thus prevented from entering the chambers when the wall structure is placed into the cooling water tanks 642. From the die 626, the wall structure 2 is initially manually pulled the length of the two cooling tanks by the extruder operator until the material reaches the mechanical or power puller 650. Each of the tanks 642, which, in a preferred embodiment, can be either a 30 foot (9 meter) or 40 foot (12 meter) trough, has at least one faucet 652; the tank can be on wheels enabling it to move towards and away from the die 626. The bath has chilled water with a temperature range of 50° F. to 60° F. (10° C. to 16° C.), to cool the extruded flexible wall structure 2 whose temperature upon entering the bath exceeds 300° F. (150° C.).

After emerging from the cooling tanks 642, the wall structure 2 is engaged by mechanical or powered puller 650. The puller 650, which can be a Goodman, is maintained at a constant speed which can range from 15 to 20 FPM to ensure consistent size of the extruded wall structure as it is pulled from the die 626. The extruded wall structure 2 then passes into a cutter 654 and is cut to a pre-determined or desired length. The wall structure is normally cut at a length of eight feet, but can be cut at any length, and proper packaging should be made available. The temperature of the extruders 622, 624, which can range from 275° F. to 350° F., the machine speed settings, which range from 20 RPM to 40 RPM on the extruders, and the powered puller's 650 speed settings control the size or thickness of the wall structure 2. These settings must be fixed initially and monitored to assure size consistency. Once operating speeds and part size are established, the wall structure is cut and packaged for shipment.

Installation of the wall structure is straightforward. The wall structure 2 is cut to the desired length or removed from its packaging or both at the installation site. Adhesive is applied to the back of the wall structure. The wall structure is applied to the wall, using the bottom 10 as a locator and leveler against the floor, assuming the bottom 10 rests on the floor and the floor is sufficiently flat. Otherwise, other leveling and locating means known in the art are used. If desired, wires can be fished through the wall structure during the installation process, either prior to the attachment of the wall structure to a wall during which time the wall structure can be moved, or after installation. An appropriate tool could be used to grasp the wire and pull or push it through a selected opening or hollow chamber 48. In contrast to prior art, the installation of wires into the wall structure is straightforward because the wires are supported by the wall structure as they are fished through it; in the prior art, the wires must be laid or placed into a baseboard, which is a more cumbersome process.

The present invention solves a prior problem of wall structures which are expensive, heavy and inflexible. The inventive product has more uniform thickness and can be made with fewer surface and dimensional imperfections and can be extruded faster because of the lower wall thickness. This is so even though the inventive wall structure apparently has varying thicknesses which were not previously possible in large scale commercial processes using plastic or rubber materials. The lighter weight wall structure is also easier to cut and to install, and less expensive to ship than a heavier, solid wall structure. However, after installation, the product appears to be solid, emulating more expensive wall structures.

The invention has been described with particular emphasis on the preferred embodiments. It should be appreciated that these embodiments are described for purposes of illustration only, and that numerous alterations and modifications may be practiced by those skilled in the art without departing from the spirit and scope of the invention. It is intended that all such modifications and alterations be included insofar as they come within the scope of the invention or the equivalents thereof.

What is claimed:

1. An extruded unitary hollow wall base structure for engaging the base of a generally planar wall and resting on the floor adjacent the wall, said hollow wall base structure having a front and back, and being made of thermoplastic heated at least to the flowing point of the thermoplastic during the extrusion of said unitary hollow wall base structure followed by cooling in a uniform manner, said wall base structure comprising a first section and a second section;

said first section comprising:
a top interior surface;
a first back wall including a generally planar first rear exterior surface and a generally planar first rear interior surface parallel to said first rear exterior surface, said first back wall having a first generally uniform thickness;
a first front wall including:
a first front exterior surface having a first front exterior contour; and
a first front interior surface with a first front interior contour corresponding to and being substantially the same as said first front exterior contour, wherein the distance between said first front exterior surface and said first front interior surface is said first generally uniform thickness; and
a first support bordering said second section interconnecting said first back wall and said first front wall, said first support including:
a first connecting upper surface distal said second section, said first connecting upper surface interconnecting said first rear interior surface and said first front interior surface; and said second section comprising:
a second back wall having a vertical orientation when said unitary wall base structure is in engagement with the base of a generally planar wall, and having a generally planar second rear exterior surface and a generally planar second rear interior surface parallel to said second rear exterior surface, said second back wall being an extension of said first back wall and said first rear exterior surface being coplanar with said second rear exterior surface, wherein the distance between said second rear exterior surface and said second rear interior surface defines a second back wall thickness equaling said first generally uniform thickness;
a second front wall being parallel with said second back wall and including:
a second front exterior surface with a second front exterior contour different from the first front exterior contour of said first front wall; and
a second front interior surface with a second front interior contour corresponding to and being substantially the same as said second front exterior contour wherein the distance between said second front exterior surface and said second front interior surface defines a second front wall thickness equaling said first generally uniform thickness; and a second support connecting said second back wall and said second front wall, said second support intersecting said second front interior surface from the extrusion, and said second support having a rectangular cross section and including:
 a second connecting upper surface interconnecting said second rear interior surface and said second front interior surface; and
 a second connecting lower surface interconnecting said second rear interior surface and said second front interior surface, the distance between said second connecting upper surface and said second connecting lower surface defining a second support thickness equaling said second generally uniform thickness;

said first rear interior surface, said first front interior surface, said top interior surface and said first connecting upper surface defining a first section space;

a first connecting lower surface proximal said second section, said first connecting lower surface interconnecting said first rear interior surface and said first front interior surface, wherein the distance between said first connecting upper surface and said first connecting lower surface defines a first support thickness having a second generally equaling the general uniform thickness;

said second rear interior surface, said second front interior surface, said first connecting lower surface and said second connecting upper surface defining a second section space, said second section space having a different shape than the shape of said first section space; and a bottom wall having a rectangular cross section and being parallel with said second support;

said first generally uniform thickness being different than said second generally uniform thickness;

the location of said first back wall, said first front wall, said first support, said second back wall, said second front wall and said second support rendering said unitary hollow wall base structure able to withstand prolonged forces and impacts;

said thermoplastic being resilient and slightly flexible; and an interface at the intersection of said second support and said second front interior surface;

wherein said unitary hollow wall base structure has a total planar rear exterior surface and is devoid of any components which extend rearwardly beyond the plane of said first rear exterior surface and of said second rear exterior surface in order for said total planar rear exterior surface to engage the generally planar wall.

2. A unitary hollow wall base structure according to claim 1, wherein said first section is a top section when said wall base structure is in use, said wall base structure further comprising a hollow bead on top of said first section, said hollow wall bead having a longitudinal cavity extending therethrough.

3. A unitary hollow wall base structure according to claim 1, wherein said second back wall and said first back wall are each a tactile surface for holding adhesive for securing said wall base structure to a wall.

4. A unitary hollow wall base structure according to claim 2, wherein said tactile surface is a set of ribs.

5. A unitary hollow wall base structure according to claim 1, wherein said first section is located on top of said second section when said wall base structure is in use.

6. A unitary hollow wall base structure according to claim 1 further comprising said first and second front exterior surfaces having a millwork appearance.

7. An extruded unitary hollow wall base structure for engaging the base of a generally planar wall and resting on the floor adjacent the wall, said hollow wall base structure having a front and back, and being made of thermoplastic heated at least to the flowing point of the thermoplastic during the extrusion of said unitary hollow wall base structure followed by cooling in a uniform manner, said wall base structure comprising a first section and a second section;
 said first section comprising:
  a first back wall including:
   a first rear exterior surface having a generally planar first rear exterior contour;
   a generally planar first rear interior surface parallel to said first rear exterior surface said first back wall having a first generally uniform thickness;
  a first front wall including:
   a first front exterior surface having a first front exterior contour;
   a first front interior surface with a first front interior contour corresponding to and being substantially the same as said first front exterior contour, wherein the distance between said first front exterior surface and said first front interior surface is said first generally uniform thickness;
 said second section comprising:
  a second back wall having a vertical orientation when said unitary wall base structure is in engagement with the base of a generally planar wall, and including
   a second rear exterior surface having a generally planar second rear exterior contour substantially the same as said first rear exterior contour and forming components of a total planar rear exterior surface of said hollow base structure;
   a generally planar second rear interior surface parallel to said second rear exterior surface, said second back wall being an extension of said first back wall, wherein the distance between said second rear exterior surface and said second rear interior surface defines a second back wall thickness equaling said first generally uniform thickness;
  a second front wall being parallel with said second back wall and including:
   a second front exterior surface with a second front exterior contour different from the first front exterior contour of said first front wall;
   a second front interior surface with a second front interior contour corresponding to and being substantially the same as said second front exterior contour wherein the distance between said second front exterior surface and said second front interior surface defines a second front wall thickness equaling said first generally uniform thickness;
  at least one support having a second generally uniform thickness and a rectangular cross section and extending between said second front interior surface and said second rear interior surface, said at least one support intersecting said second front interior surface from the extrusion;
 wherein said first rear exterior contour and said second rear exterior contour are different from at least one of either said first front exterior contour or said second front exterior contour; and a bottom wall having a rectangular cross section and being parallel with said second support;

said unitary hollow wall base structure being able to withstand prolonged forces and impacts;

said second support cooperating withstand said second back wall and said second front wall to define at least one section space for enabling the holding of various electrical and other conduits; and said thermoplastic being resilient and slightly flexible; and an interface at the intersection of said at least one support and said second front interior surface;

wherein said unitary hollow wall base structure has a total planar rear exterior surface and is devoid of any components which extend rearwardly beyond the plane of said first rear exterior surface and of said second rear exterior surface in order for said total planar rear exterior surface to engage the generally planar wall.

8. A unitary hollow wall base structure according to claim 1 further comprising a rear wall material and front wall material, said front wall material being highly pigmented without any filler;

wherein said front of said unitary hollow wall base structure comprises said front wall material and said back of said unitary wall base structure comprises said rear wall material, said front wall material and said rear wall material being different.

9. A unitary hollow wall base structure according to claim 7 further comprising said first and second front exterior surfaces having a millwork appearance.

10. A unitary hollow wall base structure according to claim 7 further comprising a rear wall material and front wall material, said front wall material being highly pigmented without any filler; wherein said front of said unitary hollow wall base structure comprises said front wall material and said back of said unitary wall base structure comprises said rear wall material, said front wall material and said rear wall material being different.

* * * * *

UNITED STATES PATENT AND TRADEMARK OFFICE
CERTIFICATE OF CORRECTION

PATENT NO. : 8,245,468 B2
APPLICATION NO. : 12/148082
DATED : August 21, 2012
INVENTOR(S) : Curtis F. Johnston Page 1 of 1

It is certified that error appears in the above-identified patent and that said Letters Patent is hereby corrected as shown below:

In the Claims

Claim 1, Column 19, true line 24 the word "first" should read --second--;

Claim 1, Column 19, true line 25 the word "first" should read --second--;

Claim 1, Column 19, true lines 28-29 cancel the text "equaling the general".

Signed and Sealed this
Twenty-ninth Day of July, 2014

Michelle K. Lee
*Deputy Director of the United States Patent and Trademark Office*